United States Patent [19]
Haugs

[11] Patent Number: 5,568,957
[45] Date of Patent: Oct. 29, 1996

[54] PRESSURE ACTUATED GRIPPING APPARATUS AND METHOD

[76] Inventor: Audun Haugs, Natlandsfjellet 56, N-5030, Landas, Norway

[21] Appl. No.: 154,166

[22] Filed: Nov. 17, 1993

Related U.S. Application Data

[63] Continuation-in-part of Ser. No. 81,004, Jun. 22, 1993, abandoned, which is a continuation of Ser. No. 778,829, Feb. 12, 1992, abandoned.

[51] Int. Cl.⁶ ........................................ B25J 15/12
[52] U.S. Cl. .................. 294/119.3; 294/98.1; 901/37
[58] Field of Search ................... 414/5; 901/37, 901/39; 294/119.3, 98.1, 63.2; 623/64.65; 92/92

[56] References Cited

U.S. PATENT DOCUMENTS 3,284,964  11/1966  Saito ............................. 414/7
3,981,528   9/1976  Andorf et al. .................. 294/119.3

FOREIGN PATENT DOCUMENTS 642789   9/1978  U.S.S.R. ...................... 294/119.3
1463471  3/1989  U.S.S.R. ...................... 294/119.3

Primary Examiner—Donald W. Underwood
Attorney, Agent, or Firm—Watts, Hoffmann, Fisher & Heinke Co., L.P.A.

[57] ABSTRACT

A pressure actuated gripping apparatus for use as a robot hand or in other applications. The device comprises a plurality of fingers moveable in response to pressurization with a fluid such as hydraulic oil. The apparatus includes a casing made of soft flexible material which is pre-shaped to assume an end flexed equilibrium position in response to pressurization with fluids. Each finger includes a longitudinal stiffening member which is flexible in a bending plane defined by motion of the finger between a flexed and an extended release position. In planes perpendicular to the bending plane, the stiffening member is substantially rigid. Each finger includes two longitudinally extending fluid chambers, and means for alternately charging and discharging the chambers. A set of first chambers, one in each finger, is connected to a common source of pressure, and the chambers communicate with one another. Pressurization of a first set of chambers, one in each finger, causes the device to assume its flexed equilibrium end configuration. Pressurization of the other set causes the device to assume its extended release configuration.

23 Claims, 4 Drawing Sheets

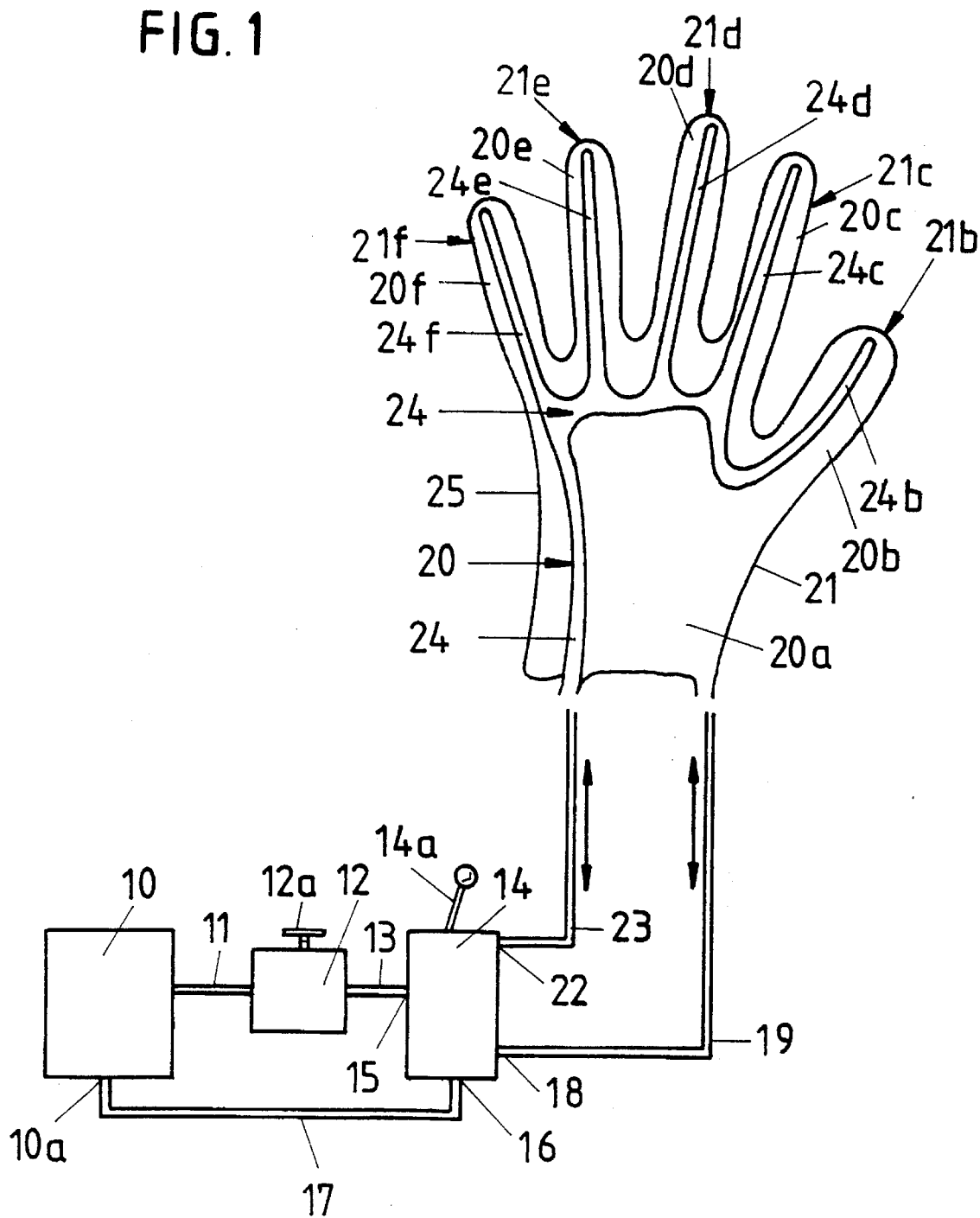

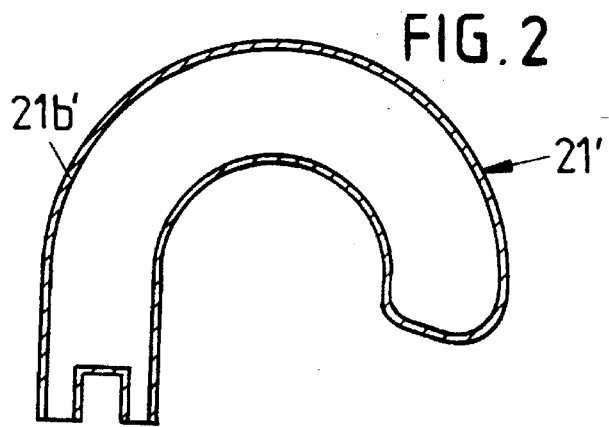
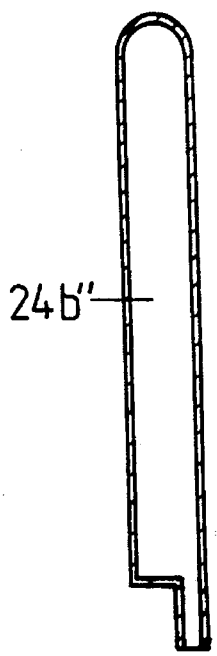
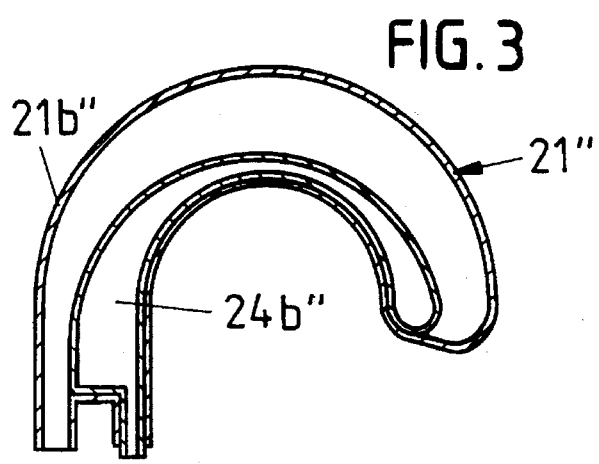
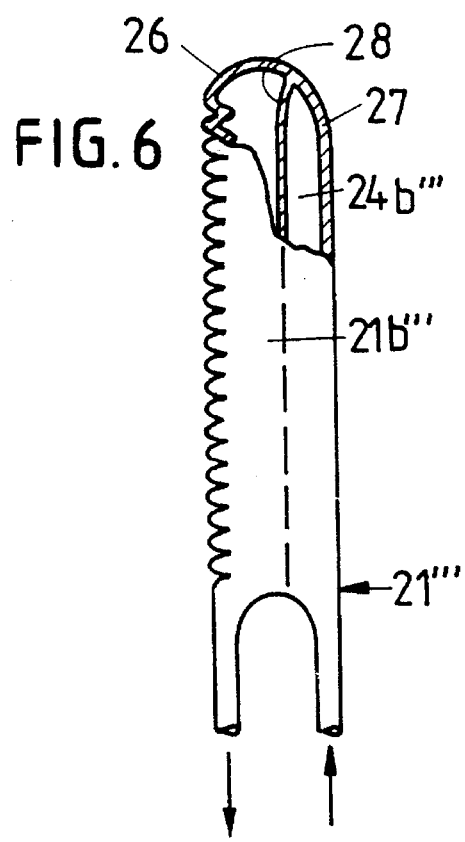
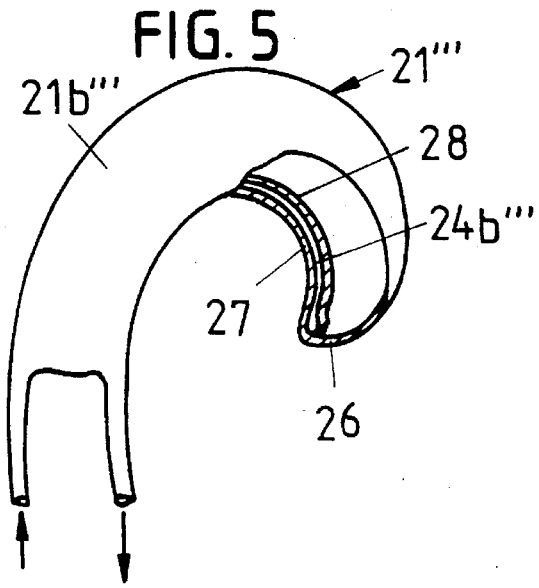

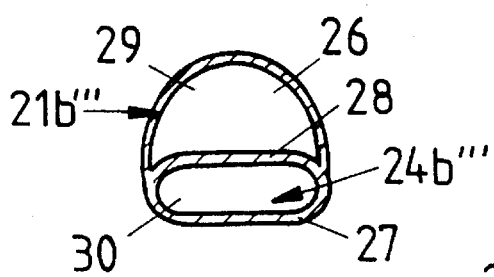
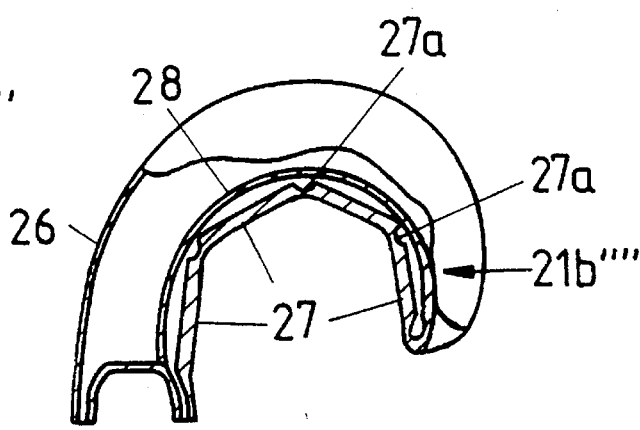
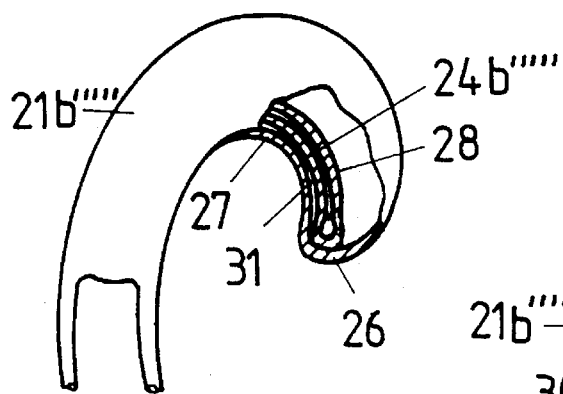
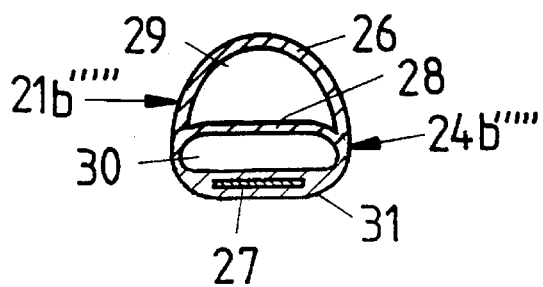

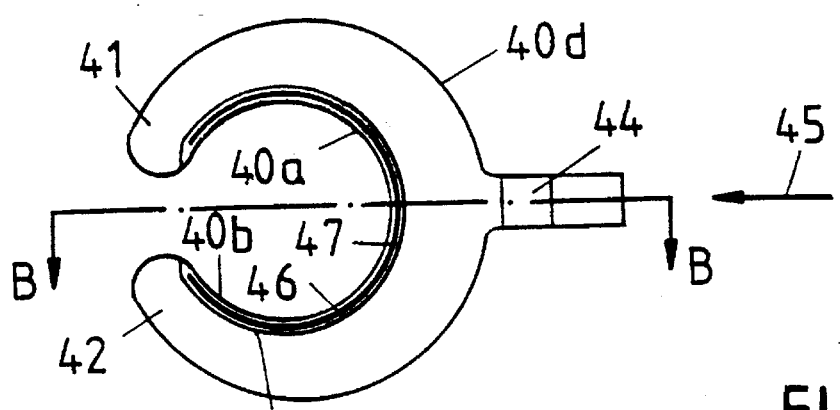
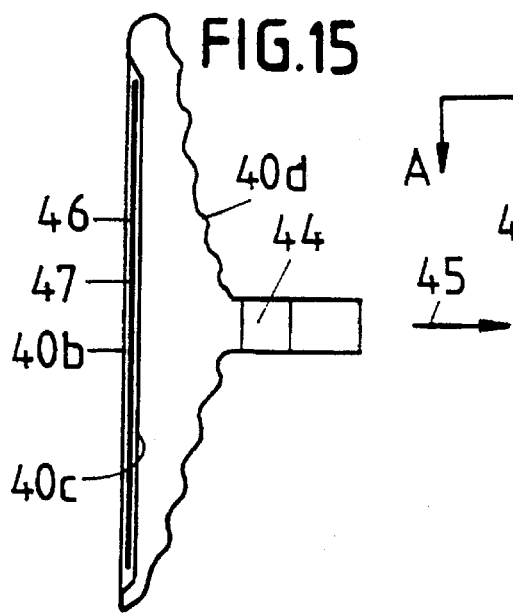
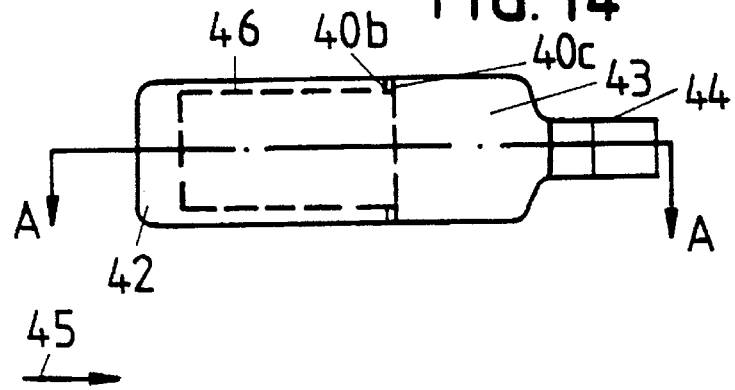
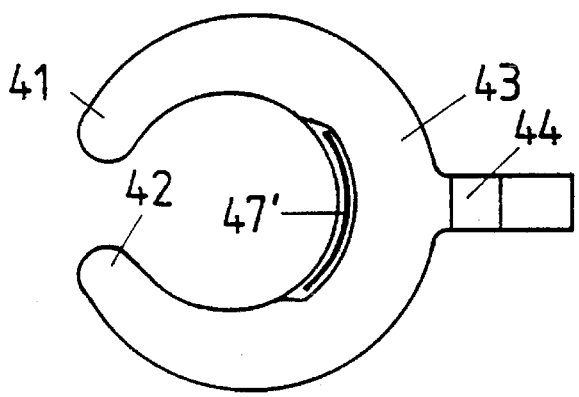

PRESSURE ACTUATED GRIPPING APPARATUS AND METHOD

CROSS-REFERENCE TO RELATED APPLICATION

This is a continuation-in-part of U.S. patent application Ser. No. 08/081,004, filed Jun. 22, 1993, which was a continuation of U.S. patent application Ser. No. 07/778,829, filed Feb. 12, 1992, both now abandoned.

BACKGROUND OF THE INVENTION

1. Technical Field

The present invention concerns a fluid pressure actuated gripping or holding apparatus. As an example, the apparatus comprises a so-called "robot hand" with two or more "robot fingers" or alternatively a device including a single "robot finger".

The gripping and holding apparatus is adjustable between a bent, or "flexed" gripping or holding mode or configuration to a release mode or configuration in relation to an object.

The present invention will find general application as a gripping and holding apparatus and more particularly as a robot hand which can be put to various uses. Apparatus of the invention can, for instance, be used as a hand prosthesis by persons with a defective or missing hand.

2. Description of the Prior Art

Up to now, such a gripping or holding apparatus typically has been based on electro-mechanical operation to produce the desired gripping and holding functions. Such known apparatuses (pincer or the like) have been complicated and costly both as regards to production and operation, and have therefore not received as wide an application as one might wish.

Such known apparatuses are particularly sensitive to outside influences and therefore are less suited to operate in relatively "dirty" environments and in environments where the device may be affected by chemically active fluids or substances. A further problem is that such devices depend on individual sensors for feedback of control signals from the gripping surfaces to the governing system, particularly in cases where it is necessary to handle the object to be gripped or held in a careful or gentle way.

It is a special object of this invention to provide a new and improved gripping/holding apparatus which can be used separately, or as part of a pressure actuated gripping and holding apparatus.

It is another object of this invention to provide a gripping and holding apparatus of special design, based on the gripping and holding apparatus which may be conveniently and economically used for many different purposes, including use as a "robot hand", and as a hand prosthesis by a person with a defective or missing hand.

It is a special object of this invention to provide a simple pressure actuated gripping and holding apparatus in a precise and reliable manner for implementing a specific adjustable clamping function, i.e., an adjustable, easily controllable gripping and holding function.

It is a further object of this invention to provide a simple feedback control system for the gripping and holding apparatus which does not require special sensors.

A general object of the invention is to produce a uniform and controlled clamping action on the object to be gripped or held.

DESCRIPTION OF THE INVENTION

According to the present invention, the gripping and holding apparatus is characterized in that at least one gripping and holding finger comprises a casing of soft, flexible material with minimum elasticity. The material has a "memory" and is initially shaped to tend to assume a pre-determined bent or flexed configuration. The casing is coupled to a pressure source by way of a valve controlled connecting structure for communication of said casing with the pressure medium source for effecting controlled inflation and deflation of the finger.

When speaking of "non-elastic" material herein, it is in general meant a material with minimum elasticity, i.e., a material that may consist of partly elastic components but as a unit comprising a rather "non-elastic" material. For example, rather non-elastic reinforcement components comprising woven or knitted fibers, threads or cords may be embedded in elastomeric materials such as natural or synthetic rubber.

The non-elastic material from which the finger is made exhibits a "memory" property. That is, the material can be initially made to have the property of being biased toward, or tending to assume, a predetermined bent or flexed equilibrium position, in the absence of external forces tending to deform the finger.

As fluid pressure is applied to the gripping finger casing the walls of the casing, and the casing itself, tend to become rigid. This increased rigidity of the finger, in its flexed position, increases the resistance of the finger to deflection. In effect, the finger, upon application of fluid pressure, becomes "stronger" and more resistant to forces which would tend to straighten it to its release configuration.

One preferred embodiment of the pressure actuated gripping apparatus of the present invention imitates properties of the human hand. The casing can be made to resemble human skin. The pressure actuation resembles musculature in appearance. The apparatus is thus well suited for use as a prosthetic hand.

The apparatus of the present invention also enjoys great versatility in terms of shapes, sizes and configurations that it can be predisposed to assume. This renders the present invention as well suited to assume different embodiments for a variety of specific applications.

In some specific applications such as in a hand prosthesis, by additionally using a flexible or articulated stiffening element inside the casing, it is possible to imitate further properties of the human hand when it comes to joints, ligaments, tendons, etc., so that the arrangement can be adjusted with regard to rigidity and strength as may be required.

In most instances where the human hand is to carry out a gripping, holding or lifting operation, it is not a question of moving each finger separately and one at a time, joint by joint, but rather of moving the fingers together in a common grip with the gripping force adjusted to the shape of the object to be gripped or held and with a more or less even or uniform clamping force provided to each finger for exertion against the object to be gripped and held. All fingers will thus move simultaneously towards a flexed position or simultaneously away from such flexed position towards a more extended and straightened out release position.

A similar effect is achieved in a simple manner by the gripping and holding device of this invention. During inflating of the gripping and holding apparatus, the bending action of the gripping and holding means will cease as soon as the pressure of gripping and holding means against the object has reached a specific equilibrium level.

According to the invention, in case of the device using more than one gripping and holding finger, it is preferred that the pressure medium be commonly applied in parallel, coupled for applying substantially equal pressure to all or most of the fingers of the gripping and holding apparatus to effect uniformly distributed clamping and squeezing force. In this way, it is possible in a simple manner to achieve an effect which, by and large, corresponds to the working operations of a human hand when it is bent around an object to be gripped and held.

The present invention includes means for determining the relationship between hydraulic pressure applied to the robot hand and the exerted actual mechanical clamping force in spite of the fact that this relationship is usually nonlinear.

One way of establishing the relationship between applied hydraulic pressure and resultant clamping force is to actually measure the clamping force applied by the hand for each of a number of different applied hydraulic pressures. The data thus gathered can be used in conjunction with a computer to control a system of one or more robot hands. This is done by loading the data into the computer in the form of a look-up table. The computer can then utilize the stored information to effect a program of desired mechanical clamping forces exerted by the robot hand when operating in accordance with the program.

Due to the nonlinearity of the relationship between applied hydraulic pressure and resultant mechanical force exerted by the hand, it is usually necessary to develop a unique table relating hydraulic pressure to clamping force for each different hand device. This is particularly true where the hand devices are made of differing material, geometry or construction, and where biasing means, such as springs, are used.

One way of using the look-up table is to provide a pressure gauge with storage means wherein the hydraulic pressure values are replaced by corresponding clamping force values from the table. Such a pressure gauge is incorporated in the robot hand pressure supply line. In this way, it is possible to operate a manually operated system in a more simple and more accurate manner. Such a system can be operated by a user who need only directly select clamping force values, rather than selecting hydraulic pressure values which must be converted to clamping force values. In this way, the system of the present invention compensates for nonlinearities in the conversion of hydraulic pressure to mechanical clamping force.

According to the invention, when the gripping and holding fingers are closing around an object, or reach the predetermined gripping and holding flexed position, the pressure in the system will start to rise. It is then possible, with a single pressure detector located in a common pressure supply line, to determine the force applied by the gripping and holding fingers. This arrangement eliminates the need for a separate sensor for each of the gripping and holding fingers, and equally important, allows disposition of even the single pressure sensor remote from the contact surface of the gripping and holding fingers.

These and other features, objects and advantages of this invention will become apparent by reference to the following detailed description and by reference to the accompanying drawings wherein:

BRIEF DESCRIPTION OF THE DRAWINGS

FIG. 1 is a diagramatic view of an apparatus in accordance with the invention, including a plan view of a gripping and holding apparatus resembling and simulating a human hand;

FIG. 2 shows, in sectional view, a casing of a gripping and holding finger of a first embodiment of the present invention;

FIG. 3 shows, in sectional view, a casing of a gripping and holding part of a second embodiment of the present invention;

FIG. 4 is a sectional view of a separate second inner casing to be inserted in a casing of FIG. 2 to form a gripping and holding finger of FIG. 3 and to be used as an inner straightening element therein;

FIG. 5 is a partially sectioned view of a modified third embodiment of the present invention in its gripping and holding position and provided with an increased wall thickness at its gripping face;

FIG. 6 shows the embodiment of FIG. 5 in its inactivated open position;

FIG. 7 is a cross sectional view of the embodiment of FIGS. 5 and 6;

FIG. 8 is a partly sectioned view of a fourth embodiment of a gripping and holding part of the present invention;

FIG. 9 is a partially sectioned view of a fifth embodiment of a gripping and holding finger of the present invention;

FIG. 10 is a in cross sectional view of the embodiment of FIG. 9;

FIG. 11 is a plan view of a leaf spring of a first embodiment to be incorporated in the finger of FIGS. 9 and 10;

FIG. 12 is a plan view of a leaf spring of a second embodiment;

FIG. 13 is a sectional view of another embodiment of the present invention as seen from the plane indicated by the line A—A of FIG. 14;

FIG. 14 is a cross sectional view of the embodiment of FIG. 13 as seen from the plane indicated by the lines B—B of FIG. 13; and FIG. 15 is a sectional view of the embodiment of FIG. 13 in an unpressurized condition; and, FIG. 16 is a sectional view of a modified version of the FIG. 13 embodiment.

BEST MODE FOR CARRYING OUT THE INVENTION

In the following description, an arrangement incorporating a gripping and holding apparatus will be described using hydraulic oil as a pressure medium, but it will be understood that with correspondingly adapted components, compressed air can alternatively be used as a pressure medium. The term "fluid" is used herein in it broad sense, encompassing both gas and liquid.

In FIG. 1, a pressure medium source or reservoir 10 is shown with a pipe connection 11 to a pressure governor 12 and with a further pipe connection 13 from the pressure governor 12 to a four-way valve 14 inlet 15.

From the valve 14, there is a pipe connection 17 from a relief source as indicated at 10a. Furthermore, from a first valve outlet 18, there is a pipe connection 19 to a first working chamber 20 in a gripping and holding apparatus which is shown in the form of a robot hand 21 with five robot fingers 21b–21f each representing a gripping and holding means incorporated in the gripping and holding apparatus.

From a second valve outlet 22 there is a pipe connection 23 to a second working chamber 24 in the robot hand 21.

At 12a, there is illustrated a wheel to adjust the pressure of the medium in said pressure governor 12 and at 14a there is illustrated a handle to control the supply of the pressure medium to or from outlets 18, 22, and to control the amount of pressure medium to and from the outlets and the adjacent chambers 20, 24.

The robot hand or gripping and holding apparatus 21 is, as shown in FIG. 1, provided with a robot hand casing 25 incorporating a chamber section 20a which resembles the palm and back of a hand. The robot hand 21 is further provided with a set of five finger casing sections 20b–20f which communicate mutually with each other via said chamber section 20a.

Inside the first working chamber 20, including the chamber sections of the five finger casing sections 20b–20f, there is arranged a second casing 24 provided with a hand chamber section 24a and five finger chamber sections 24b–24f communicating mutually via said hand chamber section 24a.

By means of said valve 14, it is possible to supply the gripping and holding apparatus 21 with a desired amount of pressure medium to one chamber, for instance, said first working chamber 20, while at the same time a corresponding amount or an adjusted amount of pressure medium is removed from the other chamber, i.e., the second working chamber 24, and vice versa. A user may thereby adjust the flexion, i.e., the straightening out of the gripping and holding apparatus 21 according to need. The individual sections of the robot hand, including the robot finger sections, may automatically be flexed separately to adjust each section of the shape of an object to be gripped and held. This means that a uniform distribution of the clamping force will be imposed on the individual sections simultaneously as each section automatically adjusts its grip with respect to individual local sections of the object to be gripped and held.

The term "adjusted amount" refers to adjusting the amount of fluid pressure during fluid pressure regulation, in order to adjust the amount of resistance exhibited by the fingers against deflection from their equilibrium positions.

It is evident from the foregoing that the apparatus of the present invention has considerable utility for handling and grasping fragile or delicate objects. In such cases, the "adjusted amount" of pressure is reduced to a rather low pressure increase.

In addition, the apparatus of the present invention is useful for gripping, holding, lifting or swinging of objects of greatly differing weights, such as heavy steel pipes covered with sensitive or fragile outer surfaces or coatings. The apparatus of the present invention enables one to adjust the fluid pressure as may be required to secure a precisely located grip on the object to be handled in a lifting or similar operation.

It is possible, for example, to lower a limp or nearly limp apparatus of this invention vertically into an intended position on an object, such as a heavy steel pipe or similar heavy structure, followed by flowing hydraulic fluid into the device to cause it to exercise its grip on the pipe or other structure in an accurate and controlled manner. These steps are followed by applying an increased fluid pressure to provide sufficient clamping and lifting rigidity so that the apparatus is enabled to lift the object in a controllable manner, all without damaging a sensitive or fragile outer surface or coating on the object.

Thus, the device can be maneuvered into the proximity of the object while in its substantially limp condition. Following this, the device is filled with hydraulic fluid, but the pressure kept low, in order that the device can assume gently and gingerly its gripping configuration. Only after the device has been thus placed into a gripping position on the object it is the hydraulic pressure fluid increased, which results in an increase in rigidity of the device at its end position of movement which represents its gripping or flexed configuration.

The term "adjusted amount" can apply to either the first chambers or the second chambers, or to both. That is, a user may, with the present invention, pressurize, or charge, only the first chambers, or only the second chambers, or both chambers, to varying degrees. For example, a user might encounter a situation in which desired clamping or gripping action or effect is provided by filling the first chambers with a relatively high pressure fluid charge, but also filling the second chambers with a lower pressure fluid charge. In such an instant, the second chambers can have a cushioning effect on the gripping action. In any event, a user can adjust to some extent the gripping characteristics of the device by providing differing pressures in the first and second chambers, with neither of the sets of chambers being empty or totally deflated.

Additionally, by removing the pressure medium from one chamber and supplying pressure medium to the other chamber, it is possible to adjust the degree to which the robot hand and the robot fingers are to be extended or straightened out in relation to the object being gripped or to be gripped.

The gripping and holding apparatus is, in the preferred embodiment, constructed of fiber reinforced elastomeric material such as natural or synthetic rubber or other rubber-like materials such as polyurethane, to provide soft and flexible, inflatable casings for the gripping and holding fingers, with little or no elasticity in the casing walls. By preshaping said casings to their respective gripping and holding configurations, it is made possible to inflate said casings to their respective gripping and holding positions in a controlled and simple manner with precision.

Because the invention will be used in a wide variety of applications, from micro manipulators to sub-sea pipe handling manipulators, the dimensions of the gripping and holding apparatus and also the thickness of material used will vary, but for best performance thereof, the material should, in general, be as soft, thin and flexible as the application permits, considering the pressure to be applied, and also the environment where it is to be used.

For handling heavy loads, i.e., loads of hundreds of kilos or more, the gripping and holding means in general are constructed of textile fabric material either woven, knitted or in cord form, which has been impregnated with or imbedded in elastomeric material. Any of the ordinary types of textile fabric materials commonly used to provide a required strength, such as cotton, nylon, rayon, and polyester are suitable for this purpose. Polyester is, however, in most cases, selected due to its stability and minimum elasticity. Alternatively, the gripping and holding fingers are constructed of three-dimensional fashion knitted or woven cores of the above-mentioned textile fabric material, and impregnated with elastomeric material.

The term "fashion knitted" means the fiber components are knitted into the approximately cylindrical fingers in a manner similar to that in which a hand-knitted stocking or geometrically similar curved object is made. Thus, a woven mesh is created. The finger acquires its preshaping by virtue of the fact that the woven mesh material knitted into the finger section varies in accordance with the specific desired equilibrium shape of the finger, by the use of techniques similar to those used in the knitting of the heel of a stocking.

The finger portions of the robot hand operate in response to being filled with hydraulic fluid or some other suitable fluid, and in response to the subsequent application of pressure (above the ambient atmospheric pressure) to that fluid. When little or no fluid is present in the finger portions, each finger portion is simply limp, and assumes no particular shape. When each finger portion is filled with fluid, it tends to assume a particular bent, or flexed, position.

If additional pressure is subsequently applied to the fluid in the casing, the casing does not tend to flex, or bend, the fingers further. Rather, as hydraulic pressure is applied, the fingers each become more rigidly disposed to their respective bent, or flexed, positions. It can therefore be seen that the bent or flexed position of each finger constitutes an equilibrium position. When the finger is filled with fluid, it will tend to assume its equilibrium position. As fluid pressure is added, the finger becomes progressively more resistant to deflection from its equilibrium position.

This construction provides a robot hand capable of providing a soft, elastic grip affording a controlled, constant squeezing force which allows the robot hand to handle fragile objects of varying sizes and varying shapes in a secure manner. The robot hand is capable, for example, of grasping around eggs of different sizes without the disadvantage of breaking some and dropping others.

The situation is somewhat different in the instances in which as shown in FIGS. 5–10 a leaf spring 31 or a thick-walled portion such as indicated at 27 is used. In those instances, each finger in which a leaf spring or thick-walled portion is used tends to assume its equilibrium position even in the absence of fluid present within the casing.

It is also contemplated that the portion of the inside of the robot hand, corresponding generally to the palm of a human hand, can also be reinforced by the use of a leaf spring, or by making the palm section, or a portion thereof, out of thicker material than is used for most of the remainder of the robot hand. This is similar to the type of reinforcement described elsewhere in this document associated with the individual finger sections of the robot hand. Also, a more rigid backside of the robot hand can be used in combination with a more flexible palm side.

If required, longitudinal or transverse support walls or partition walls can be used to keep a desired accurate spacing between the palm face and the back face of the robot hand, independent of the pressure level being employed in the robot hand.

A hand with too soft a palm face, when subjected to relatively higher pressure, may exhibit an undesirable bulging or convex stretching of the palm face. This may be compensated for by using curved inserts in either the back face and/or in the palm face of the hand.

Alternately, the partitions described above may be used. Such partition walls should be spaced, one from another, by a distance which is not greater than the spacing between the palm face and the back face of the hand. Also, as mentioned above, the inserts or partitions may extend longitudinally, i.e., roughly parallel to the fingers, or transversely, i.e., roughly perpendicular to the fingers.

In the embodiment illustrated in FIG. 1, the robot hand casing 25 and each of its five finger simulating casing sections 21b–21f is manufactured in its intended gripping and holding position. This means that the robot hand casing 25 is produced with a longitudinally concave and transversely convex palm side portion and a longitudinally and transversely convex back side portion, and that each finger simulating section 21b–21f is produced with a similar longitudinally concave and transversely convex gripping and holding face portion and a longitudinally and transversely convex back side portion. That is to say, when the robot hand is in its equilibrium gripping position, the portion of the hand corresponding to the palm of a human hand is generally concave, while the portion of the robot hand corresponding to the back of the human hand is generally convex.

When the robot hand casing 25 and its five finger sections 21b–21f is inflated, the same automatically takes the intended curved gripping and holding position. This curved gripping and holding position is provided by inflating the robot hand casing 25 and its associated finger casing sections as a unit. One essential effect of such combined inflating of said hand casing 25 and its associated finger sections 21b–21f is that an evenly distributed clamping effect is achieved by a supply of a common pressure medium, i.e., fluid.

Alternatively, said curved gripping and holding position can be achieved by solely inflating each of its finger sections individually (not further shown herein in detail) by using separate finger-shaped gripping and holding means and supplying them with pressure medium individually.

The main part of the robot hand casing 25 is, in the preferred embodiment, as illustrated in FIG. 1, procured with a longitudinal flexed curvature at the outer and inner faces thereof.

Alternatively, or additionally, the robot hand casing 25 is produced with a lateral curvature at the outer and inner face thereof.

In FIGS. 2, 3, 5, 8 and 9 are illustrated five different embodiments of a finger simulating casing section 21', 21'', 21b''', 21'''' and 21b''''' in their respective curved gripping and holding positions.

In practice, this means that said finger casing sections 21', 21b'', 21b''', 21b'''' and 21b''''' can be regarded either as separate robot finger units or as robot finger sections incorporated in the robot hand casing 25.

In all embodiments, the flexible inflatable casing, i.e., the robot hand casing 25 and each finger casing section 21b', 21b'', 21b''', 21b'''' and 21b''''', is made of rather thin-walled non-elastic material with a preshaped curved or flexed gripping and holding position.

FIG. 2 illustrates a rather simple and uncomplicated embodiment of a finger simulating casing section 21b' having rather thin-walled casing material. In its uninflated or deflated condition, it will, while maintaining its preformed curved condition, easily be deformed to allow it to be applied to an object to be gripped and held. Inflating the casing section 21b', produces a self-supporting, rather rigid, casing section construction achieved by means of pressurized fluid, combined with the rather thin-walled, preshaped, non-elastic wall material. By regulating the pressurized medium in the casing section 21b', the clamping force thereof can be adjusted accurately and accordingly from a rather weak to a rather strong clamping force, as may be required in each application.

When using said casing sections in more complex arrangements such as in a robot hand or in a hand prosthesis as illustrated in FIG. 1, each casing section may have additional means for specific operation thereof, such as means for intermittent opening and closing of a grip. In order to provide a satisfactory opening or releasing of a grip, several alternative means can be used, as illustrated in FIGS. 3–12.

In each finger casing section 21b''–21'''', a second casing can be incorporated therein as stated with reference to the general arrangement illustrated in FIG. 1.

In FIG. 3 a second casing 24b", as illustrated in FIG. 4, is located inside a first finger casing section 21b". This second casing 24" will generally have the same total length as the finger casing section 21b", but may have a smaller diameter and be of a lighter and thinner wall material. The initial shape of this second casing 24b" is that of a straight tube with a closed outer end. Optionally the second casing 24b" is fastened inside the finger casing section 21b" along one of the curved sides thereof to produce a finger corresponding to the construction shown in FIG. 5, or solely at opposite ends of said finger casing corresponding to the construction shown in FIG. 9. In the illustrated embodiment, the second casing 24b" is fastened along the concavely curved wall that forms the gripping and holding face of the casing section 21b". The second casing 24b" will usually have a pressure medium source connection separate from the pressure medium source connection to the outer finger casing section 21b".

When the finger casing section 21b" is inflated by pressure medium, and the second casing 24b" takes its inactivated uninflated state, the second casing 24b" will be deformed in an arbitrary manner inside the finger casing section and may easily follow the flexed or curved shape of the finger casing section 21b" as illustrated in FIG. 3. Employment of the second casing 24b" within the finger casing section 21b" will not negatively influence operations of the finger casing section 21b". Normally, the intention is to inflate the second casing 24" only when the finger casing section 21b" is deflated, but, of course, there is also a possibility to inflate the second casing 24b" when the finger casing section 21b" is partly loaded. The latter solution may, for instance, result in an oscillating or "pumping" effect on the gripping and holding apparatus by intermittent charging and discharging pressure medium either of the casing section 21b" or of the second casing section 24b" or alternatively, of both, in combination.

In FIGS. 5–7, a third embodiment of a casing section 21b''' is illustrated and represents a modified embodiment of the casing section 21b". In this third embodiment, a second casing section 24b''' is incorporated in the casing section 21b'''. More specifically, there is a first wall 26 of rather thin-walled material providing a longitudinally and laterally convex back side portion of the casing section 21b'''. Further, there is a second opposite wall 27 of rather thick-walled material providing a longitudinally concave and laterally convex gripping side portion. There is also a third wall 28 of rather thin-walled material forming a partition wall between said walls 26 and 27. As shown in FIG. 6, the wall 26 may assume a bellows shape when the finger is in an extended and nonpressurized configuration.

A first chamber 29 is provided in the finger casing section 21b''' between the walls 26 and 28 whereas the second, rather thick wall 27 provides a rigid wall section of the finger casing section 21b'''. A second chamber 30 is provided in the second casing section 24b''' between the walls 27 and 28, and the second thick wall portion 27 provides a rigid wall section also of said second casing section 24b'''. The thick wall 27 forms a stiffening element in the finger casing section 21b''' to maintain the intended gripping position thereof in its deflated state and also to provide a more accurate gripping position in its inflated gripping state. By inflating the second casing section 24b''', the finger casing section 21b''' may be deformed or straightened out to a more or less straight shape with the rather thick wall 27 deformed accordingly. This again means that the finger casing section 21b''' is allowed to be straightened out to an inactivated open release position.

FIG. 8 illustrates a forth embodiment of a finger casing section 21b'''. FIG. 8 shows a modification of the third finger casing section 21b''' by forming weakened portions in the thick wall 27. Said weakened portions are provided by grooves 27a extending transversely at the inner face of the wall 27.

FIGS. 9 and 10 illustrate a fifth embodiment of a finger casing section 21b''''. FIGS. 9 and 10 show a modification of the third finger casing section 21b''' incorporating a leaf spring 31 in a center portion of the thick wall 27. The leaf spring is preshaped to a flexed curvature as illustrated in FIG. 9, but is allowed to be deformed to a more or less straight extension by inflating the second chamber 30.

Alternatively, the leaf spring can be manufactured with a rectilinear extension, whereas the finger casing section is preshaped to a shape similar to that illustrated in FIG. 9. This means that the finger casing section in its inflated state will easily take the intended flexed or curved position, as illustrated in FIG. 9, against the spring force of the leaf spring and as soon as the finger casing section is deflated, the leaf spring will deform the finger casing section into a more or less straight shape. This latter solution allows deletion of the partition wall 28, as illustrated in FIG. 9. Another advantage of the embedded leaf spring is the extra stability it adds to the gripping and holding apparatus in its opened and in its partially closed positions. It also enables the gripping and holding device to work from a single pressure source.

FIG. 11 illustrates a simple first embodiment of a leaf spring 31 to be employed in the embodiment of FIG. 9. The leaf spring 31 is, however, illustrated in FIG. 11 in a flat shape, whereas the leaf spring in practice can be shaped to any suitable curved or flexed position.

A modified leaf spring as shown in FIG. 12 is a leaf spring with a number of weakened zones along the length of the spring. This will cause the leaf spring to bend at the weakened zones only, when the gripping and holding parts are closing its grip, and thus cause the main casing to imitate the movement of a human finger.

With the modified second embodiment of a leaf spring 31' of FIG. 12 a number of weakened portions 32 are provided by cut-outs or cavities 32 at spaced intervals in each of the longitudinal edges of the leaf spring 31'. By means of said weakened portions 32 of the leaf spring 31', it is possible, in the associated finger casing section, to imitate the bending lines of a human finger.

In the embodiments illustrated herein, the main reference of the gripping and holding apparatus has been to a hand and finger prosthesis and a similar robot hand and robot finger. It is, however, evident that the number of, and the individual location, dimension and shape of the robot hand and of each robot finger in practice may differ from that stated and shown herein. In practice, a pair of separate fingers or groups of separate fingers may be located at opposite sides of the object to be gripped and held in order to surround said object more or less completely. Alternatively, a group of fingers at one side of said object may act against, for example, a single stationary finger or a group of stationary fingers at the opposite side of said object. In many applications, the total support surface provided by the finger or by a number of fingers at one side of said object should more or less correspond to a similar support surface at the opposite side of said object independent of the number of fingers employed on either side. It is also obvious that the fingers at one side of the object could be adjusted into different positions whereas the finger(s) at the opposite side of the object could take a permanent non-adjustable support position or a less adjustable support position. It is also obvious that each finger could be shaped and dimensioned to provide a specific grip on a specific object to be gripped and held.

A further embodiment of the present invention is illustrated in FIGS. 13 and 14. FIGS. 13 and 14 show a casing 40 comprising two finger sections 41, 42 and an intermediate transition section 43 made of soft, flexible material with minimum elasticity.

The intermediate transition section 43 includes a working chamber which is connected by a rigid coupling nipple 44 to a source of fluid pressure medium reservoir 10, as shown in FIG. 1, by means of a single tube connection as indicated by arrow 45.

The casing 40 has a gripping face 40a which defines a pocket between a main casing material sheet identified by reference character 40b and an overlapping material sheet 40c defining a pocket 46 housing leaf spring 47. The leaf spring 47 is in the shape of a cylindrical segment. FIGS. 13 and 14 illustrate the casing 40 in its pressurized condition with the leaf spring 47 bent into a C-shaped support position. The pocket 46 is indicated by dotted lines in FIG. 14.

In this configuration, the C-shaped spring 47 extends over an angle of about 300° and the spring biases the casing 40 to attain an open-ended, inactive position in its unpressurized state, as illustrated in FIG. 15. When in the position of FIG. 15, the wall 40d, like the wall 26 of the embodiment of FIG. 6, assumes a bellows configuration. In practice, a substantially shorter leaf spring can be used, such that the C-shape may extend over some lesser angle of, for example, 90°–300°. This means that the spring 47 when corresponding substantially to the dimension of the transition section 43, can assist the casing 40 to attain the desired open-ended, inactive position, as illustrated in FIG. 16.

In some cases, it is desirable that the leaf spring 47 have a breadth dimension which is relatively large in relation to the spacing between the leaf spring and a backside face 40d of the casing 40. This design makes it possible to control the shape, or configuration, of the bent casing 40 in its pressurized condition.

When a short leaf spring is used, as indicated at reference character 47' in FIG. 16, which encompasses a relatively small angle of, for example, 90° the finger configuration on pressurization will be bent to a significant degree in both the pressurized and unpressurized conditions of the hand. This facilitates provision of a softer grip using unsupported finger sections 41, 42.

The present invention has been described with a degree of particularity, but it is the intent that the invention include all modifications from the disclosed preferred design falling within the spirit or scope of the appended claims.

I claim:

1. A fluid actuable gripping apparatus comprising:
   a) at least one gripping and holding finger;
   b) said at least one finger comprising at least two interconnected casings of non-elastic soft and flexible materials defining at least two chambers having at least one common wall, said finger being initially shaped into a predetermined gripping configuration, said finger being responsive to fluid inflation to enhance its resistance to deflection from said predetermined gripping configuration as a function of increasing fluid pressure within said casing; and
   c) a first regulating vane connection coupled to the interior of at least one of said casings and couplable to a source of pressurized fluid for facilitating controlled inflation and deflation of said finger.

2. A fluid actuable gripping apparatus comprising:
   a) at least one gripping and holding finger;
   b) said finger comprising a casing of non-elastic soft and flexible materials, said finger being initially shaped into a predetermined gripping configuration, said casing being responsive to fluid inflation to enhance its resistance to deflection from said predetermined gripping configuration as a function of increasing fluid pressure within said casing;
   c) said casing comprises a first outer casing portion and a second inner casing portion within said first outer casing portion;
   d) said apparatus further comprises a first regulating valve means for coupling said first outer casing portion with a fluid pressure medium source, wherein application of pressure from said first source causes said first outer casing portion to exert a clamping force; and
   e) said apparatus further comprises a second regulating valve means for coupling said second inner casing portion with a fluid pressure medium source for causing said second inner casing portion to respond to the application of pressure thereto to provide a releasing force substantially opposite said clamping force.

3. The apparatus of claim 2, wherein:
said first outer casing portion and said second inner casing portion share a common wall.

4. The apparatus of claim 2, wherein:
said second inner casing portion is fastened within said first outer casing portion near opposite ends of said second inner casing portion.

5. The apparatus of claim 4, wherein:
one wall of said second inner casing portion is fastened along a wall of said first outer casing portion.

6. The apparatus of claim 3, wherein:
said first outer casing portion includes a face portion adapted for gripping and holding an object.

7. The apparatus of claim 6, wherein:
a stiffening element is incorporated proximate said gripping and holding face portion.

8. The apparatus of claim 7, wherein:
said stiffening element comprises a leaf spring.

9. A pressure operated gripping apparatus comprising:
   a) at least two fingers adjustable between a flexed gripping configuration and a release configuration;
   b) each finger comprising a flexible casing having a main portion comprising soft, flexible and non-elastic material and a stiffening element which is flexible in a first plane but relatively rigid in a second plane substantially perpendicular to said first plane, said stiffening element biasing the finger toward said flexed gripping configuration;
   c) each casing including structure dividing the casing into first and second internal chambers;
   d) a regulator;
   e) a pressure medium charging source;
   f) a pressure medium release source;
   g) means coupling said chambers to said pressure medium charging source and said pressure release source by way of said regulator for effecting alternate charging and discharging of said first and second chambers; and
   h) charging of said first chamber causing the finger to both apply gripping force and to increase its rigidity.

10. The apparatus of claim 9, wherein:
said second chamber is located between said first chamber and said stiffening element.

11. The apparatus of claim 9, wherein:
a) said casing comprises front and rear portions;
b) said front portion including a face part located substantially opposite said rear portion of said casing; and
c) said main portion being said rear portion and having a substantially greater length than said face part.

12. The apparatus of claim 9, wherein:
each said stiffening element forms at least a portion of a wall of its casing.

13. The apparatus of claim 9, wherein:
said main portion of said casing is configured in a bellows shape.

14. The apparatus of claim 9, wherein:
said stiffening element has a jointed configuration.

15. The apparatus of claim 9, wherein:
said second chamber is located in the first chamber and the structure dividing the casing into chambers is connected to the casing proximate an end of the casing.

16. A pressure operated gripping apparatus comprising:
a) at least two fingers adjustable between a flexed end position defining a flexed gripping configuration and an extended end position defining an extended release configuration by movement in bending planes defined respectively by each finger;
b) each finger comprising a flexible casing having a main portion comprising soft, flexible material and a stiffening element longitudinally disposed therein which is flexible in the bending plane defined by such finger but relatively rigid in a second plane substantially perpendicular to said bending plane;
c) each casing including structure for dividing the casing into longitudinally extending first and second internal casing chambers, said second chamber being located within said first chamber, said first chamber being larger than said second chamber;
d) a pressure medium charging source;
e) a pressure medium release source;
f) means coupling each of said first and second chambers, respectively, in common to said pressure medium charging source and to said pressure release source, respectively, for effecting alternate charging and discharging of said first chambers and of said second chambers, in unison, and at a common pressure for said first chambers and for said second chambers, respectively;
g) charging of said first chambers causing the fingers to both apply gripping force and to increase their rigidity and their resistance to deflection from said flexed end position.

17. The apparatus of claim 16, wherein:
a) said casing portions are front and rear portions corresponding to the palm and back of a human hand, respectively;
b) said front portion includes a face part for actually contacting an object to be grasped, said face portion being located on inside portions of said finger;
c) said main portion being said rear portion and having a substantially greater length than said face part.

18. The apparatus of claim 16, wherein:
at least a part of said main portion of said casing is bellows shaped.

19. The apparatus of claim 16, wherein:
said stiffening element has a jointed configuration.

20. The apparatus of claim 16, wherein:
said second chamber is located within said first chamber and is connected to the casing proximate an end of the casing, and said first chamber is longer than said second chamber.

21. The apparatus of claim 16, wherein at least a part of said second chamber has thicker walls than said first chamber.

22. A pressure fluid operated gripping apparatus comprising:
a) at least one gripping and holding finger adjustable between a flexed gripping and holding position and a release position;
b) said at least one finger comprising first and second interconnected casings, said first casing being made of soft, flexible and rather non-elastic material and being shaped into a predetermined shape configuration defining said flexed gripping and holding position and said second casing being made at least partly of soft, flexible and rather non-elastic material and being shaped into a predetermined shape configuration defining a stretched out position of said finger;
c) said first casing containing at least one pressure fluid receiving chamber, wherein pressure fluid provides for internal support of said at least one finger in said flexed gripping and holding position;
d) a pressure fluid charging source;
e) a pressure fluid release source;
f) a regulating valve;
g) at least one valve connection connecting said regulating valve with said at least one fluid receiving chamber;
h) coupling means for selective coupling of said at least one chamber to one of said sources.

23. The apparatus of claim 22, wherein:
a) said at least one valve connection comprises a first valve connection coupled to the interior of said first casing and a second valve connection coupled to the interior of said second casing; and,
b) said valve is arranged to operate said first and second valve connections by communicating said first valve connection with a fluid charging source to inflate said first casing and simultaneously communicating said second valve connection with a fluid release source to deflate said second casing, and vice versa.

* * * * *